United States Patent
Xia et al.

(10) Patent No.: US 11,576,186 B2
(45) Date of Patent: Feb. 7, 2023

(54) METHOD FOR PROCESSING REMOTE INTERFERENCE MEASUREMENT SIGNAL, BASE STATION AND STORAGE MEDIUM

(71) Applicants: China Mobile Communication Co., Ltd Research Institute, Beijing (CN); China Mobile Communications Group Co., Ltd., Beijing (CN)

(72) Inventors: Liang Xia, Beijing (CN); Ting Ke, Beijing (CN); Hua Shao, Beijing (CN); Guang Yang, Beijing (CN)

(73) Assignees: CHINA MOBILE COMMUNICATION CO., LTD. RESEARCH INST, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 259 days.

(21) Appl. No.: 16/967,986

(22) PCT Filed: Jan. 10, 2019

(86) PCT No.: PCT/CN2019/071220
§ 371 (c)(1),
(2) Date: Aug. 6, 2020

(87) PCT Pub. No.: WO2019/154006
PCT Pub. Date: Aug. 15, 2019

(65) Prior Publication Data
US 2021/0368510 A1    Nov. 25, 2021

(30) Foreign Application Priority Data
Feb. 9, 2018    (CN) .......................... 201810134886.7

(51) Int. Cl.
*H04W 72/08* (2009.01)
*H04W 72/04* (2009.01)

(52) U.S. Cl.
CPC ..... *H04W 72/082* (2013.01); *H04W 72/0426* (2013.01); *H04W 72/0446* (2013.01); *H04W 72/0453* (2013.01)

(58) Field of Classification Search
CPC ........... H04W 72/082; H04W 72/0426; H04W 72/0446; H04W 72/0453; H04W 92/20; H04W 24/08; H04W 24/02; H04W 24/10
See application file for complete search history.

(56) References Cited

U.S. PATENT DOCUMENTS 10,193,727 B1 * 1/2019 Sung ..................... H04L 5/0048
2014/0219113 A1    8/2014 Li et al.
(Continued)

FOREIGN PATENT DOCUMENTS

CN    101820636 A    9/2010
CN    104219724 A    12/2014
(Continued)

OTHER PUBLICATIONS

International Search Report dated Apr. 10, 2019 in corresponding PCT Application No. PCT/CN2019/071220.
(Continued)

*Primary Examiner* — Chi H Pham
*Assistant Examiner* — Raul Rivas
(74) *Attorney, Agent, or Firm* — Syncoda LLC; Feng Ma

(57) ABSTRACT

The embodiments of the present disclosure disclose a method for processing a remote interference measurement signal, a base station and a storage medium. The method includes that: a first base station determines configuration information of an interference measurement signal; and the first base station transmits the interference measurement (Continued)

signal according to the configuration information of the interference measurement signal.

20 Claims, 8 Drawing Sheets

(56) References Cited

U.S. PATENT DOCUMENTS

| | | | |
|---|---|---|---|
| 2015/0189666 | A1 | 7/2015 | Wang et al. |
| 2015/0333893 | A1 | 11/2015 | Lee et al. |
| 2016/0112177 | A1 | 4/2016 | Zheng et al. |
| 2017/0126340 | A1 | 5/2017 | Li et al. |
| 2021/0337510 | A1* | 10/2021 | Shen ................ H04W 72/1289 |

FOREIGN PATENT DOCUMENTS

| | | |
|---|---|---|
| CN | 104956716 A | 9/2015 |
| CN | 105337688 A | 2/2016 |
| EP | 2 856 826 | 4/2015 |

OTHER PUBLICATIONS

Written Opinion of the International Searching Authority dated Apr. 10, 2019 in corresponding PCT Application No. PCT/CN2019/071220.

ZTE et al., "Discussion on Measurements and RS Design for CLI Mitigation," R1-1704434, 3GPP TSG RAN WG1 Meeting #88bis, Apr. 7, 2017, pp. 1-11.

"Discussion on remote interference management," 3GPP TSG RAN WG1 Meeting #89, R1-1708401, CMCC, May 15-19, 2017.

"Cross-link interference management based on coordinated beamforming," 3GPP TSG RAN WG1 Meeting #89, R1-1708056, Samsung, May 15-19, 2017.

"UL/DL interference scenarios in LTE TDD," 3GPP TSG-RAN WG1 #66, R1-112084, Ericcson et al., Aug. 22-26, 2011.

"3rd Generation Partnership Project; Technical Specification Group Radio Access Network; Evolved Universal Terrestrial Radio Access (E-UTRA); Physical channels and modulation (Release 15)," 3GPP TS 36.211 V15.0.0, Dec. 2017.

Supplementary European Search Report dated Feb. 17, 2021 in corresponding European Patent Application No. 19750434.3.

* cited by examiner

METHOD FOR PROCESSING REMOTE INTERFERENCE MEASUREMENT SIGNAL, BASE STATION AND STORAGE MEDIUM

CROSS-REFERENCE TO RELATED APPLICATION

This application is a U.S. National Phase of PCT International Application No. PCT/CN2019/071220 with an International Filing Date of Jan. 10, 2019, which claims under 35 USC § 119(a) the benefit of Chinese Patent Application No. 201810134886.7, filed on Feb. 9, 2018, the entire contents of which are incorporated by reference herein.

TECHNICAL FIELD

The present disclosure relates to a remote base station interference technology, and particularly to a method for processing a remote interference measurement signal, a base station and a storage medium.

BACKGROUND

An interference phenomenon of a remote base station has a particularly wide influence (up to a few hundred kilometers (km)) and may involve the base stations in multiple cities, multiple provinces, or even multiple countries. Different cities, provinces, and even countries use base station devices of different manufacturers, so if there is no standardized remote interference management mechanism, collaboration among manufactures will be particularly difficult.

For the above problem, China Mobile regulates, through enterprise standards, a remote base station interference management mechanism in a Long Term Evolution (LTE) network. The remote base station interference management mechanism regulates in the enterprise standards of China Mobile includes two steps as follows: 1) locating an interfering base station that causes a remote interference; and 2) manually adjusting a frame structure of the interfering base station.

However, a remote base station interference management method adopted in a current LTE network has the following problems: 1) it is not flexible enough: once a remote interfering base station is located, the frame structure can only be adjusted manually to perform interference fallback; 2) large performance loss: only the frame structure 3:9:2 can be selected for the interference fallback. Compared with the frame structure 9:3:2, 6 Downlink Orthogonal Frequency Division Multiplexing (OFDM) Symbols (DL OS) are lost in the frame structure 3:9:2, and the downlink transmission performance loss is large.

SUMMARY

In view of this, embodiments of the present disclosure provide a method for processing a remote interference measurement signal, a base station and a storage medium to solve at least one problem existing in the prior art.

The technical solutions of the embodiments of the present disclosure are implemented as follows.

The embodiments of the present disclosure provide a method for processing a remote interference measurement signal, which may include the following operations.

A first base station determines configuration information of an interference measurement signal.

The first base station transmits the interference measurement signal according to the configuration information of the interference measurement signal.

The embodiments of the present disclosure provide a method for processing a remote interference measurement signal, which may include the following operations.

A second base station determines the configuration information of at least one interference measurement signal.

The second base station receives the interference measurement signal according to the configuration information of the interference measurement signal.

The embodiments of the present disclosure provide a base station, which may include a first processor and a first transceiver.

The first processor is configured to determine the configuration information of the interference measurement signal.

The first transceiver is configured to transmit the interference measurement signal according to the configuration information of the interference measurement signal.

The embodiments of the present disclosure provide a base station, which may include a second processor and a second transceiver.

The second processor is configured to determine the configuration information of at least one interference measurement signal.

The second transceiver is configured to receive the interference measurement signal according to the configuration information of the interference measurement signal.

The embodiments of the present disclosure provide a base station, which may include a memory and a processor. The memory may store a computer program capable of running in the processor. The processor may be configured to execute the program to implement the steps in the method for processing a remote interference measurement signal.

The embodiments of the present disclosure provide a computer-readable storage medium, in which a computer program may be stored. The computer program, when executed by a processor, implements the steps in the method for processing a remote interference measurement signal.

In the embodiments of the present disclosure, the first base station determines the configuration information of the interference measurement signal, and transmits the interference measurement signal according to the configuration information of the interference measurement signal. In such a manner, the flexibility of resource reuse of the interference measurement signal can be improved through the flexible parameter configuration.

DETAILED DESCRIPTION

For the above problem that there is no standardized remote interference management mechanism, China Mobile regulates, through enterprise standards, a remote base station interference management mechanism in an LTE network.

Figure 1:
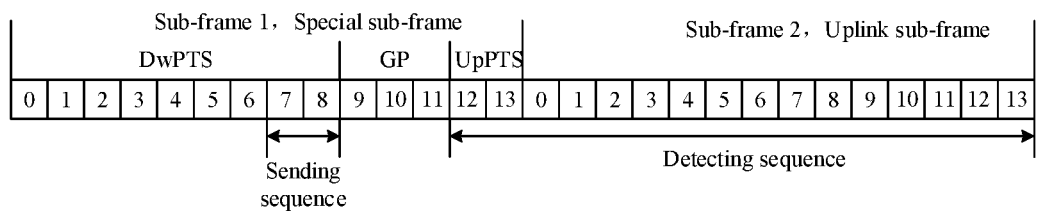
FIG. 1 is a schematic diagram of a frame structure.
Figure 2:
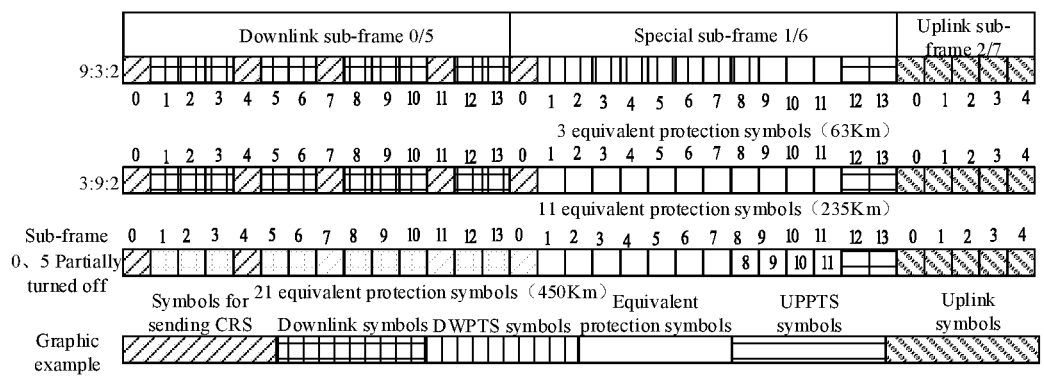
FIG. 2 is a schematic diagram of an interference fallback technology.

Before the remote base station interference management mechanism is introduced, the following frame structures and interference fallback techniques are introduced. As shown in FIG. 1 and FIG. 2, the LTE network configures a special sub-frame (S) with a structure of 9:3:2 by default, that is, the special sub-frame of LTE includes 14 OSs. The OSs #0 to #8 are configured as DL, the OSs #9 to #11 are configured as Guard Period (GP), and the rest OSs #12 to #13 are configured as Uplink (UP).

The remote base station interference management mechanism regulated in the enterprise standards of China Mobile includes two steps as follows: 1) locating an interfering base station that causes a remote interference; and 2) manually adjusting a frame structure of the interfering base station.

At step 1), the interfering base station that causes a remote interference is located.

At least one first base station takes 1024 radio frames as a first period (corresponding to 10.24 s), selects a particular radio frame in the first period, and transmits a first Reference Signal (RS). The first RS is used to find and locate a remote base station interference source.

In particular, the offset of the particular radio frame in the first period is determined by an Identification (ID) of the first base station. Therefore, when sensing the first RS, a second base station can deduce in reverse a part of attributes of the ID of the first base station with reference to an offset position of the radio frame, where the first RS is located, in the first period.

In some embodiments, in the selected radio frame, the first base station fixedly transmits the first RS in the last two OSs (corresponding to the OSs #7 to #8) in a Downlink Pilot Time Slot (DwPTS) of a sub-frame 1.

On the other hand, the first base station needs to try to detect, in all radio frames in the first period, a second RS sent by other base stations, in order to find and locate the remote interference from the other base stations.

In some embodiments, the first base station monitors the second RS2 on UpPTS in each radio frame and on 16 OSs (corresponding to the OSs #12 to #13 of a special sub-frame and all the OSs of a sub-frame 2).

At step 2), the frame structure of the interfering base station is manually adjusted.

Once the first base station detects a certain second RS, it reports the second RS to a network management unit. The network management unit deduces in reverse the ID of a third base station according to the offset position of the radio frame, where the second RS is located, in the first period. The third base station transmits the second RS. Subsequently, the special sub-frame of the third base station is manually configured as a structure of 3:9:2, that is, the OSs #0 to #2 in the LTE special sub-frame are configured as DL, the OSs #3 to #11 are configured as GP, and the rest OSs #12 to #13 are configured as UL. Compared with the default frame structure of 9:3:2, the frame structure 3:9:2 uses fewer DL symbols, so it is reasonable to expect that DL transmission in the base station adopting the frame structure of 3:9:2 may reduce UL interference to other remote base stations.

Figure 3:
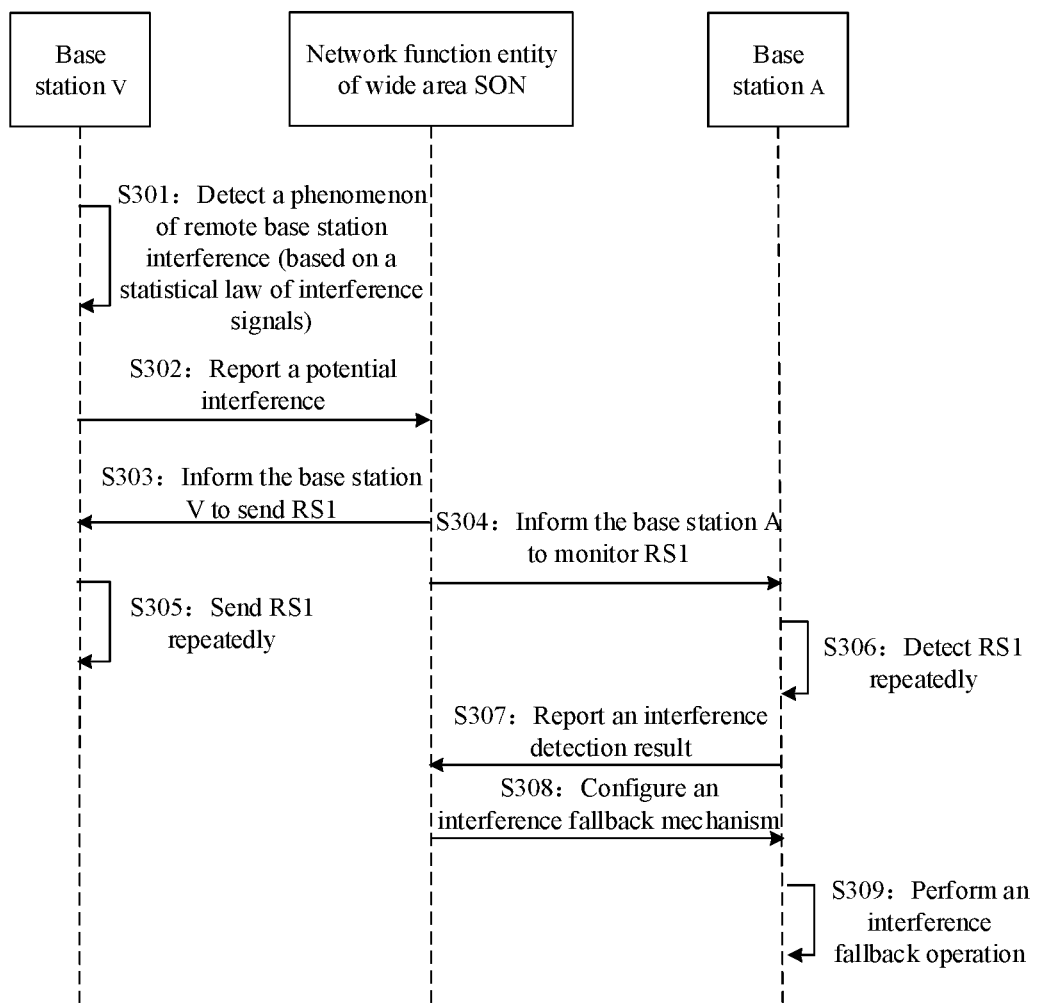
FIG. 3 is a schematic diagram of a remote base station interference management process of Self-Organized Network (SON) management according to an embodiment of the present disclosure.

For the above problem of inflexibility, in the embodiments, it is firstly put forward a remote base station interference management process based on SON management. As shown in FIG. 3, the process includes the following steps.

At S301, a base station V detects a remote base station interference phenomenon (based on a statistical law of interference signals).

At S302, the base station V reports a potential interference to a network function entity of SON.

At S303, the network function entity of SON informs the base station V to transmit a first RS (RS1).

At S304, the network function entity of SON informs a base station A to monitor the RS1.

At S305, the base station V transmits the RS1 repeatedly.

At S306, the base station A detects the RS1 repeatedly.

At S307, the base station A reports an interference detection result to the network function entity of SON.

At S308, the network function entity of SON configures an interference fallback mechanism for the base station A.

At S309, the base station A performs an interference fallback operation.

The embodiments of the present disclosure disclose a method for processing a remote interference measurement signal for S304 and S305.

The technical solutions of the present disclosure will further be elaborated below in combination with the drawings and the embodiments.

The embodiments disclose a method for processing a remote interference measurement signal. The method is applied to a base station. A function realized by the method may be realized by calling a program code through a processor in the base station. Of course, the program code may be stored in a computer storage medium. It can be seen that the base station at least includes the processor and the storage medium.

Figure 4A:
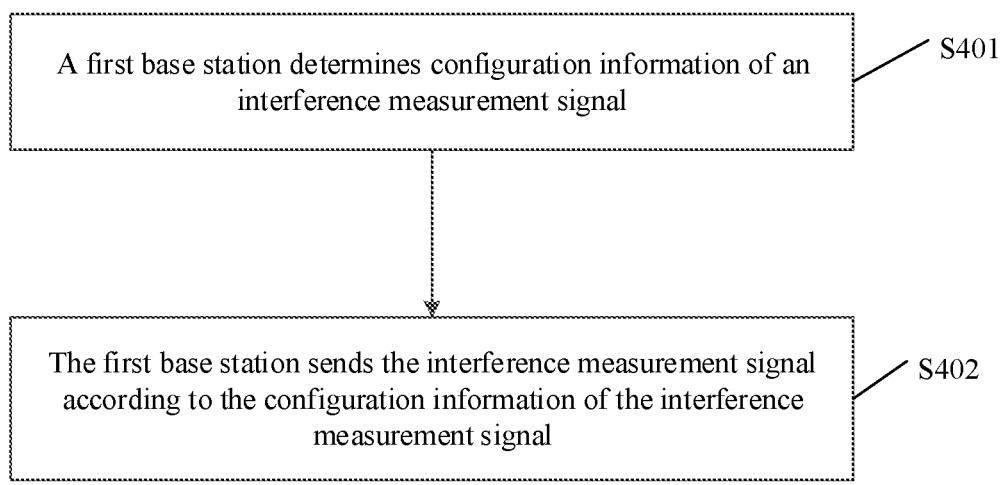
FIG. 4A is an implementation flowchart of a method for processing a remote interference measurement signal according to an embodiment of the present disclosure.

FIG. 4A is an implementation flowchart of a method for processing a remote interference measurement signal according to an embodiment of the present disclosure. As shown in FIG. 4A, the method includes the following steps.

At S401, a first base station determines configuration information of an interference measurement signal.

At S402, the first base station transmits the interference measurement signal according to the configuration information of the interference measurement signal.

In some embodiments, the operation that the first base station determines the configuration information of the interference measurement signal may include the following steps.

At S11, the first base station determines a parameter ID according to its own base station ID.

At S12, the first base station determines a parameter set according to the parameter ID, the parameter set comprising at least one type of configuration information of the interference measurement signal.

In some embodiments, the interference measurement signal is a signal for measuring the degree of interference between base stations. The degree of interference between base stations at least comprises one of the following: the degree of interference of a downlink signal of the first base station to an uplink signal of another base station, and the degree of interference of the downlink signal of the first base station to the downlink signal of UE served by another base station. The degree of interference between the base stations may be expressed by receiving power, receiving quality, receiving strength, and receiving signal-to-noise ratio of the interference measurement signal measured by the other base station or the terminal served by the other base station. The function of interference measurement signals lies in that another base station may identify the interfering base station, determine the intensity of interference, and determine an interfered radio resource location by detecting the interference measurement signal sent by the first base station.

In some embodiments, the method may further include that: the first base station pre-stores, pre-configures or randomly selects at least one parameter sets; or the first base station determines the parameter set according to the configuration of the network function entity. The parameter set at least comprises one of the following configuration information of the interference measurement signal:

sequence ID, sequence length, time domain resource location, bandwidth, frequency domain location, sub-carrier spacing, and transmitting power.

In some embodiments, the method may further include that: the first base station reports the parameter set to the network function entity.

In some embodiments, the method may further include that: the first base station determines the sequence length according to the system bandwidth of the first base station or the bandwidth of a Bandwidth Part (BWP) carrying a synchronization signal or the maximum number of sub-carriers or the number of sub-carriers of the BWP carrying the synchronization signal.

In some embodiments, the operation that the first base station determines the sequence length according to the maximum number of sub-carriers of the first base station may include the following operation.

The first base station calculates the sequence length M according to the formula $M=2^{(floor(log2(N+1)))}-1$, where N is the number of sub-carriers, floor represents rounding down, log2 represents finding a logarithm base 2, and ^ represents a power operation.

In some embodiments, the time domain resource location is represented by at least one of the following combinations:

a period and a slot offset in the period;

a period, a slot offset in a period and the number of repetitions in a period;

a period, a slot offset in a period, the number of repetitions in a period, a time domain resource granularity(ies), and a symbol location in a time slot;

a time domain resource granularity(ies) and a symbol location in a time slot; and the start time of a time domain resource of the interference measurement signal and the duration of the time domain resource of the interference measurement signal.

In some embodiments, a time domain resource meeting that a remainder obtained by dividing an index of the time domain resource location by the period is equal to a time slot offset in the period is at the time domain resource location; or a time domain resource meeting that the remainder obtained by dividing the index of the time domain resource location by the period is equal to a time slot offset in the period, and following Q continuous or discontinuous available time domain resources or Q continuous or discontinuous resource granularities of the available time domain resources, are at the time domain resource location, where Q is an integer greater than 0, and the available time domain resources or the resource granularities of the available time domain resources refer to time domain resources or resource granularities of the time domain resources that can be used to transmit the interference measurement signal. In some embodiments, the method may further include that: the index of the time domain resource location slot_index is determined according to the formula Mod(slot_index, Period)=offset, where mod( ) represents a mod operation, Period represents the period, and offset represents the time slot offset in the period.

In some embodiments, the time domain resource location further comprises the location of at least one OFDM symbol in a transmitting time slot; correspondingly, the method may further include the following operation.

The location of the OFDM symbol is determined according to a symbol offset and/or the number of repetitions in a time slot of the interference measurement signal.

Figure 4B:
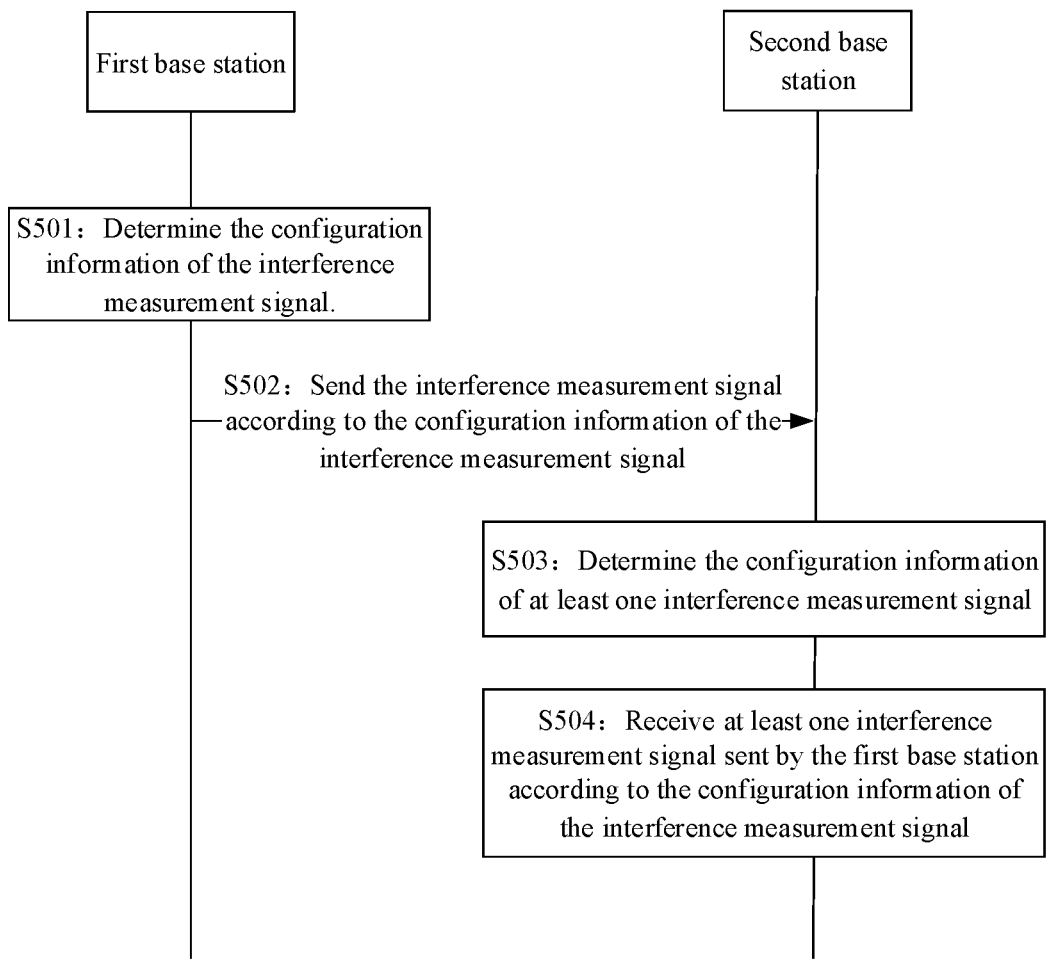
FIG. 4B is an implementation flowchart of another method for processing a remote interference measurement signal according to an embodiment of the present disclosure.

FIG. 4B is an implementation flowchart of another method for processing a remote interference measurement signal according to an embodiment of the present disclosure. As shown in FIG. 4B, the method includes the following steps.

At S501, the first base station determines configuration information of an interference measurement signal.

At S502, the first base station transmits the interference measurement signal according to the configuration information of the interference measurement signal.

At S503, the second base station determines the configuration information of at least one interference measurement signal.

At S504, the second base station receives at least one interference measurement signal sent by the first base station according to the configuration information of the interference measurement signal.

In some embodiments, the operation that the second base station determines the configuration information of the interference measurement signal may include the following operations.

The second base station determines the parameter ID according to its own base station ID.

The second base station determines the parameter set according to the parameter ID, the parameter set comprising at least one type of configuration information of the interference measurement signal.

In some embodiments, the method may further include that: the second base station pre-stores, pre-configures or randomly selects at least one parameter set; or the second base station determines the parameter set according to the configuration of the network function entity. The parameter set comprises at least one of the following configuration information of the interference measurement signal:

the sequence ID, the sequence length, the time domain resource location, the bandwidth, the frequency domain location, the sub-carrier spacing, or the transmitting power.

In some embodiments, the measurement results comprise at least one of the following: parameter ID of the interference measurement signal, receiving power of the interference measurement signal, or receiving delay of the interference measurement signal.

In some embodiments, the method may further include that: the second base station detects the interference measurement signal according to the parameter set, and obtains measurement results. The measurement results comprise at least one of the following: the parameter ID of the interference measurement signal, the receiving power of the interference measurement signal, or the receiving delay of the interference measurement signal.

In some embodiments, the method may further include that: the second base station reports the measurement results to the network function entity; or, the second base station performs interference management according to the measurement results.

In some embodiments, the method may further include that: the second base station reports at least one group of measurement results corresponding to one interference measurement signal to the network function entity.

In some embodiments, the method may further include that: if the receiving power of the interference measurement signal exceeds a first threshold, the second base station reports the measurement results to the network function entity, or performs the interference management.

In some embodiments, the first threshold is pre-configured, or configured by the network function entity.

The embodiments involves a method of configuring an RS for remote base station interference management and reporting of measurement results. For the problem of remote base station interference management, a solution process provided by the embodiments may include the following steps.

At S11, after detecting the remote base station interference phenomenon, the first base station reports the remote interference phenomenon to the network function entity of SON.

At S12, the network function entity of SON informs the first base station to transmit the RS for the remote base station interference management, and informs the second base station to monitor the RS.

At S13, the second base station reports the interference detection result to the network function entity of SON.

At S14, the network function entity of SON configures the second base station to perform the interference fallback operation.

At S15, the second base station performs the interference fallback operation.

How to configure the RS and how to report the measurement results of the RS are all problems to be solved. To this end, the embodiments provide the following solutions.

(1) The first base station determines the configuration information of the interference measurement signal for the remote base station interference management, and transmits the interference measurement signal according to the configuration information of the interference measurement signal. The configuration information includes the parameter ID, the sequence ID, the sequence length, the time domain resource location, the bandwidth, the frequency domain location, the sub-carrier spacing, the transmitting power, and etc.

(2) The second base station determines the configuration information of at least one interference measurement signal, and receives the interference measurement signal according to the configuration information of the interference measurement signal.

(3) The second base station reports the measurement results of the interference measurement signal. The measurement results include the parameter ID, the receiving power, the receiving delay, and etc.

It can be seen from above that the technical solutions of the embodiments define the configuration information of the interference measurement signal used for remote interference management and a method for reporting measurement results, thereby solving the problem of configuring the remote interference measurement signal and the problem of reporting the measurement results.

Embodiment One

The first base station determines the configuration information of the interference measurement signal, and transmits the interference measurement signal according to the configuration information of the interference measurement signal. The configuration information of the interference measurement signal includes at least one of the following parameters.

(1) Parameter ID. The first base station may pre-store or pre-configure at least one parameter set, each parameter set having a unique corresponding parameter ID, and the first base station may determine the parameter set by determining the parameter ID. For example, the first base station may determine the parameter ID according to its own base station ID. The parameter set includes at least one of the following parameters (2) to (7).

(2) Sequence ID of the interference measurement signal. The sequence ID is used for generating an interference measurement signal sequence.

(3) Sequence length of the interference measurement signal. The sequence length refers to the number of symbols contained in the original interference measurement signal. The sequence length may be determined according to the system bandwidth of the first base station or the bandwidth of the BWP carrying the synchronization signal or the maximum number of sub-carriers or the number of sub-carriers of the BWP carrying the synchronization signal. For example, the sequence length of the interference measurement signal may be determined according to a value range to which the system bandwidth of the first base station or the bandwidth of the BWP carrying the synchronization signal or the maximum number of sub-carriers or the number of sub-carriers of the BWP carrying the synchronization signal belongs and a mapping relationship between the value range and a candidate sequence length. Taking that the sequence length is determined according to the maximum number of sub-carriers of the first base station for example, the sequence length may be determined according to the following mapping relationship, in which N, N1, N2, N3, N4, M, M1, M2 and M3 are positive integers.

| The maximum number N of sub-carriers | Sequence Length M |
| --- | --- |
| [N1, N2) | M1 |
| [N2, N3) | M2 |
| [N3, N4) | M3 |

In some embodiments, the values of N and M may be as follows.

| The maximum number N of sub-carriers | Sequence Length M |
| --- | --- |
| [1023, 2047) | 1023 |
| [2047, 4095) | 2047 |
| [4095, 8191) | 4095 |

Or, the sequence length may be represented as $M=2^{(\text{floor}(\log_2(N+1)))}-1$, where N is the number of sub-carriers, floor represents rounding down, log2 represents finding a logarithm base 2, and ^ represents a power operation.

For example, if the system bandwidth is 20 MHz, the sub-carrier spacing is 15 kHz, and the number of sub-carriers is 1200, then the sequence length may be 1023 (supposing the sequence is a Gold sequence). If the system bandwidth is 100 MHz, the sub-carrier spacing is 30 kHz, and the number of sub-carriers is 3300, then the sequence length may be 2047 (supposing the sequence is a Gold sequence).

(4) Time domain resource location of the interference measurement signal. The time domain resource location may be represented by one or more of the following parameters: a period, a time slot offset in a period, the number of repetitions in a period, a time domain resource granularity(ies), a symbol location in a time slot; the start time of a time domain resource of the interference measurement signal, the duration of the time domain resource of the interference measurement signal, and end time of the time domain resource of the interference measurement signal.

Figure 5A:
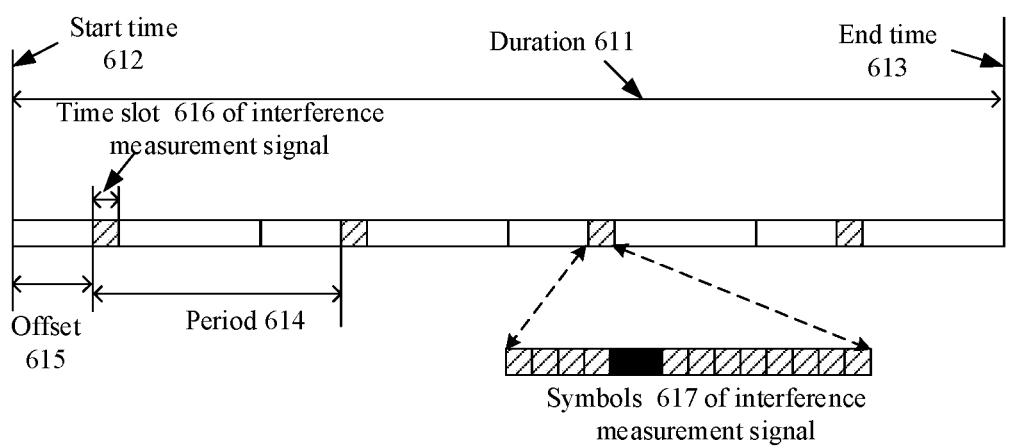
FIG. 5A is a schematic diagram of a relationship among parameters representing time domain resource locations according to an embodiment of the present disclosure.

FIG. 5A shows a relationship among the duration 611 of the time domain resource of the interference measurement signal, the start time 612 of the time domain resource of the interference measurement signal, and the end time 613 of the time domain resource of the interference measurement signal, that is, the length of time between the start time 612 and the end time 613 is the duration 611. FIG. 5A also shows a relationship among a period 614, the offset 615 in the period and the time slot 616 of the interference measurement signal, that is, a period 614 is composed of the offset 615 in the period and the time slot 616 of the interference measurement signal. In addition, FIG. 5A also shows a relationship between the time slot 616 of the interference measurement signal and the symbol 617 (OFDM symbol) of the interference measurement signal, that is, a time slot includes a plurality of symbols. It is to be noted that the time domain resource location may be represented by a time slot index (slot_index). In some embodiments, the time slot index (slot_index) for transmitting the interference measurement signal meets the following conditions:

Mod(slot_index, Period)=offset, where mod( ) represents a mod operation, and offset represents the time slot offset in the period. The time domain resource granularity of the period and the offset in the period is slot. Further, the time domain resource granularity of the period and the offset in the period may also be multiple slots or the sub-frame or the radio frame.

In some embodiments, the interference measurement signal may be sent on at least one OFDM symbol in a transmitting time slot. For example, each slot is composed of multiple OFDM symbols (e.g. 14 OFDM symbols). The first base station also needs to determine the location of at least one OFDM symbol in the transmitting slot. The location may be determined according to a symbol offset and/or the number of repetitions in the slot of the interference measurement signal.

(5) Bandwidth and frequency domain location of the interference measurement signal. The bandwidth and frequency domain location of the interference measurement signal may be represented by the BWP or a Resource Block (RB) or the sub-carrier. For example, the bandwidth and frequency domain location of the interference measurement signal may be the same as the BWP of a synchronization signal carried by the first base station.

(6) Sub-carrier spacing of the interference measurement signal. For example, the sub-carrier spacing of the interference measurement signal may be the same as the sub-carrier spacing of the synchronization signal of the first base station, or may be a fixed value or a value related to a carrier frequency.

(7) Transmitting power of the interference measurement signal. The transmitting power of the interference measurement signal does not exceed the maximum transmitting power of the first base station.

Except for above mentioned method for determining the above parameters, the above parameters may also be determined by the first base station according to the configuration of a network unit (the network function entity), or pre-configured by the first base station, or randomly selected by the first base station. If the above parameters are determined according to the base station ID, or pre-configured, or randomly selected, the first base station further needs to report the above parameters to the network unit.

The interference measurement signal is a signal for measuring the degree of interference between the base stations. The degree of interference between the base stations may be the degree of interference of the downlink signal of the first base station to the uplink signal of another base station, or the degree of interference of the downlink signal of the first base station to the downlink signal of UE served by another base station, or the signal strength of the interference measurement signal which is transmitted by the first base station and received by another base station, or the signal strength of the interference measurement signal which is transmitted by the first base station and received by the UE served by another base station.

Embodiment Two

The second base station determines the configuration information of at least one interference measurement signal, and receives the interference measurement signal according to the configuration information of the interference measurement signal. Transmitting configuration information of the interference measurement signal expected to be received includes at least one of the following parameters.

(1) Parameter ID. The second base station may pre-store or pre-configure at least one parameter set, each parameter set having a unique corresponding parameter ID, and the second base station may determine the parameter set by determining the parameter ID. The parameter set includes at least one of the following parameters (2) to (7).

(2) Sequence ID of the interference measurement signal. The sequence ID is used for generating the interference measurement signal sequence.

(3) Sequence length of the interference measurement signal. The sequence length refers to the number of symbols contained in the original interference measurement signal.

(4) Time domain resource location of the interference measurement signal, which is the same as in the first embodiment.

(5) Bandwidth and frequency domain location of the interference measurement signal. The bandwidth and frequency domain location of the interference measurement signal may be represented by the BWP or the RB or the sub-carrier.

(6) Sub-carrier spacing of the interference measurement signal.

(7) Transmitting power of the interference measurement signal. The transmitting power of the interference measurement signal does not exceed the maximum transmitting power of the first base station.

The above parameters or parameter sets may be determined according to the configuration of the network unit or pre-configured.

In some embodiments, the second base station detects the interference measurement signal according to the above received parameters (at least one parameter set), and reports the measurement results to the network unit. The measurement results may be at least one of the following: the parameter ID of the interference measurement signal, the receiving power of the interference measurement signal, or the receiving delay of the interference measurement signal. The receiving delay refers to a time difference between the moment when the second base station detects the interference measurement signal and the moment when the interference measurement signal is transmitted.

In some embodiments, the second base station detects the interference measurement signal according to the above received parameters (at least one parameter set). If the receiving power of the interference measurement signal exceeds the first threshold, then the second base station reports the measurement results corresponding to the interference measurement signal to the network unit, or the second base station performs interference management. The measurement results may be at least one of the following: the parameter ID of the interference measurement signal, the receiving power of the interference measurement signal, or the receiving delay of the interference measurement signal.

The receiving delay refers to the time difference between the moment when the second base station detects the interference measurement signal and the moment when the interference measurement signal is transmitted. The first threshold may be pre-configured, or configured by the network unit.

Figure 5B:
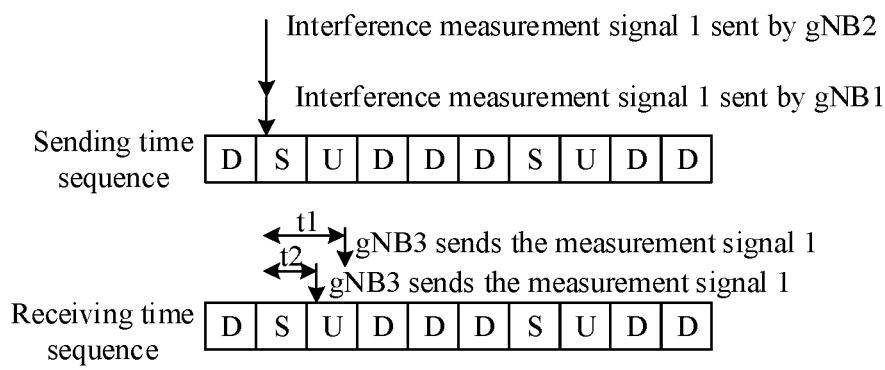
FIG. 5B is a schematic diagram of detecting interference measurement signals at two different moments and generating receiving delays of different interference measurement signals according to an embodiment of the present disclosure.

It is to be noted that one interference measurement signal or one group of interference measurement signals may correspond to a plurality of measurement results. For example, a plurality of interference source base stations (the first base stations) multiplex the same interference measurement signal for transmission, and the interference measurement signals transmitted by the different first base stations arrive at the second base station (the interfered base station) at different times, so it is possible for the second base station to detect the interference measurement signal at two different moments and generate different receiving delays of the interference measurement signal. The base station gNB1 transmits the interference measurement signal 1, and the base station gNB2 also transmits the interference measurement signal 1. As shown in FIG. 5B, that is, the gNB1 and the gNB2 transmit the interference measurement signals simultaneously on the same time sequence. Another base station gNB3 receives both the interference measurement signal 1 transmitted by the base station gNB1 and the interference measurement signal 1 transmitted by the base station gNB2; however, due to the different locations of the base station gNB1 and the base station gNB2, the times of arriving at the base station gNB3 are different. If the length of time between the transmitting moment 1 of the interference measurement signal 1 transmitted by the base station gNB1 and the receiving moment 1 of the interference measurement signal 1 received by the base station gNB3 is t1, and the length of time between the transmitting moment 2 of the interference measurement signal 1 transmitted by the base station gNB2 and the receiving moment 2 of the interference measurement signal 1 received by the base station gNB3 is t2, then t1 and t2 are different. If the base station gNB3 detects the interference measurement signal at both the moments, both the gNB1 and the gNB2 are the interfering base stations. If the gNB3 detects the interference measurement signal at one moment, the interfering base station is determined according to the delay (the time difference between t1 and t2).

In some embodiments, the second base station may report at least one group of measurement results corresponding to one interference measurement signal to the network unit. Each group of measurement results may be at least one of the following: the parameter ID of the interference measurement signal, the receiving power of the interference measurement signal, or the receiving delay of the interference measurement signal.

In some embodiments, the network unit determines the first base station that causes interference to the second base station based on the measurement results reported by the second base station. If the network unit determines that multiple first base stations may cause interference to the second base station, the network unit may reconfigure and transmit mutually orthogonal interference measurement signals to the multiple first base stations and receive the interference measurement signals for the second base station again.

In the prior art, a remote interference phenomenon has a particularly wide influence (a few hundred kilometers) and may involve the base stations in multiple cities, multiple provinces, or even multiple countries. Different cities, provinces, and even countries use base station devices of different manufacturers, so if there is no standardized remote interference management mechanism, collaboration among manufactures will be particularly difficult. In the remote interference management process based on SON, when different base stations adopt different frame structures for configuration, the remote interference management method may fail.

The technical solutions provided by the embodiments of the present disclosure can improve the flexibility of resource reuse of the interference measurement signal through the flexible parameter configuration, can reduce detection complexity through the configuration of start time and end time of the transmitting/receiving operation, and improve resource reuse with the first base stations through the flexible configuration of time resources.

Figure 6:
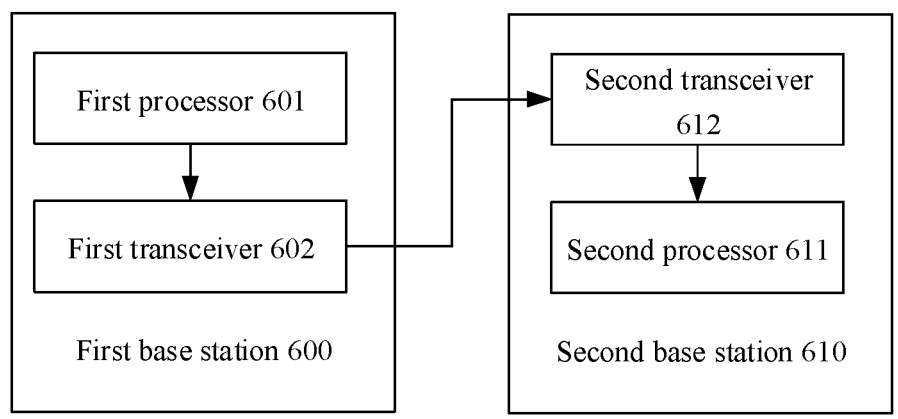
FIG. 6 is a block diagram of a system for processing a remote interference measurement signal according to an embodiment of the present disclosure.

The embodiments of the present disclosure provide a system for processing a remote interference measurement signal. FIG. 6 is a block diagram of the system for processing a remote interference measurement signal according to an embodiment of the present disclosure. As shown in FIG. 6, the system includes a first base station and a second base station. The first base station 600 may include a first processor 601 and a first transceiver 602. The second base station 610 may include a second processor 611 and a second transceiver 612.

The first processor 601 is configured to determine the configuration information of the interference measurement signal.

The first transceiver 602 is configured to transmit the interference measurement signal according to the configuration information of the interference measurement signal.

The second processor 611 is configured to determine the configuration information of at least one interference measurement signal.

The second transceiver 612 is configured to receive the interference measurement signal according to the configuration information of the interference measurement signal.

In some embodiments, the operation of determining the configuration information of the interference measurement signal may include that: the parameter ID is determined according to the base station ID; and a parameter set is determined according to the parameter ID, the parameter set including the configuration information of the interference measurement signal of at least one type.

In some embodiments, the interference measurement signal is a signal for measuring the degree of interference between base stations. The degree of interference between base stations comprises at least one of the following: the degree of interference of the downlink signal of the first base station to the uplink signal of another base station, and the degree of interference of the downlink signal of the first base station to the downlink signal of UE served by another base station. The degree of interference between the base stations may be represented by receiving power, receiving quality, receiving strength and receiving signal-to-noise ratio of the interference measurement signal measured by the other base station or the terminal served by the other base station.

In some embodiments, the first processor is further configured to pre-store, pre-configure or randomly select to determine at least one parameter set, or determine the parameter set according to the configuration of the network function entity. The parameter set comprises at least one of the following configuration information of the interference measurement signal: the sequence ID, the sequence length, the time domain resource location, the bandwidth, the frequency domain location, sub-carrier spacing, and the transmitting power.

In some embodiments, the first transceiver is further configured to report the parameter set to the network function entity.

In some embodiments, the first processor is further configured to determine the sequence length according to the system bandwidth of the first base station or the bandwidth of the BWP carrying the synchronization signal or the maximum number of sub-carriers or the number of sub-carriers of the BWP carrying the synchronization signal.

In some embodiments, the operation of determining the sequence length according to the maximum number of sub-carriers of the first base station may include that: the first base station calculates the sequence length M according to the formula $M=2^{(floor(log2(N+1)))}-1$, where N is the number of sub-carriers, floor represents rounding down, log2 represents finding a logarithm base 2, and ^ represents a power operation.

In some embodiments, the time domain resource location is represented by at least one of the following:

a period and a slot offset in the period;

the period, the slot offset in the period and the number of repetitions in the period;

the period, the slot offset in the period, the number of repetitions in the period, the time domain resource granularity(ies), and the symbol location in the time slot;

the time domain resource granularity(ies) and the symbol location in the time slot; and the start time of the time domain resource of the interference measurement signal and the duration of the time domain resource of the interference measurement signal.

In other embodiments, a time domain resource meeting that a remainder obtained by dividing an index of the time domain resource location by the period is equal to a time slot offset in the period is at the time domain resource location; or a time domain resource meeting that the remainder obtained by dividing the index of the time domain resource location by the period is equal to a time slot offset in the period, and following Q continuous or discontinuous available time domain resources or Q continuous or discontinuous resource granularities of the available time domain resources, are at the time domain resource location, where Q is an integer greater than 0, and the available time domain resources or the resource granularities of the available time domain resources refer to time domain resources or resource granularities of the time domain resources that can be used to transmit the interference measurement signal. In some embodiments, the first processor is further configured to determine the index slot_index of the time domain resource location according to the formula Mod(slot_index, Period) =offset, where mod( ) represents a mod operation, Period represents the period, and offset represents the time slot offset in the period.

In some embodiments, the time domain resource location further comprises the location of at least one OFDM symbol in the transmitting time slot; correspondingly, the method may further include the following operation.

The location of the OFDM symbol is determined according to the symbol offset and/or the number of repetitions in an interference measurement signal slot.

In some embodiments, the measurement results comprise at least one of the following: the parameter ID of the interference measurement signal, the receiving power of the interference measurement signal, and the receiving delay of the interference measurement signal.

In some embodiments, the second processor is further configured to detect the interference measurement signal according to the parameter set, and obtain the measurement results. The measurement results comprise at least one of the following: the parameter ID of the interference measurement signal, the receiving power of the interference measurement signal, and the receiving delay of the interference measurement signal.

In some embodiments, the second processor is further configured to perform interference management according to the measurement results.

In some embodiments, the second transceiver is configured to report the measurement results to the network function entity.

In some embodiments, the second transceiver is configured to report at least one group of measurement results corresponding to one interference measurement signal to the network function entity.

In some embodiments, the second processor is configured to determine whether the receiving power of the interference measurement signal exceeds the first threshold, and if so, trigger the second transceiver to report the measurement results to the network function entity. Or, the second processor is configured to perform interference management.

In some embodiments, the first threshold is pre-configured, or configured by the network function entity.

The above descriptions about the system embodiments are similar to descriptions about the method embodiments and beneficial effects similar to those of the method embodiments are achieved. Technical details undisclosed in the system embodiments of the present disclosure may be understood with reference to the descriptions about the method embodiments of the present disclosure.

It is to be noted that, in the embodiments of the present disclosure, when being implemented in form of software function module and sold or used as an independent product, the method for processing a remote interference measurement signal may also be stored in a computer-readable storage medium. Based on such an understanding, the technical solutions of the embodiments of the present disclosure substantially or parts making contributions to the conventional art may be embodied in form of software product, and the computer software product is stored in a storage medium, including a plurality of instructions configured to enable a computing device (which may be a personal computer, a server, a network device or the like) to execute all or part of the method in each embodiment of the present disclosure. The storage medium includes: various media capable of storing program codes such as a U disk, a mobile hard disk, a Read Only Memory (ROM), a magnetic disk or an optical disk. Therefore, the embodiments of the present disclosure are not limited to any specific hardware and software combination.

Correspondingly, the embodiments of the present disclosure provide a base station, which may include a memory and a processor. The memory may store a computer program capable of running in the processor. The processor may execute the program to implement the steps in the method for processing a remote interference measurement signal.

In some embodiments, the base station may be the first base station, which may include a first memory and a first processor. The first memory may store a computer program capable of running in the first processor. The first processor may execute the program to implement the steps in the method for processing a remote interference measurement signal at the first base station side.

In another embodiment, the base station may be the second base station, which may include a second memory and a second processor. The second memory may store a computer program capable of running in the second processor. The second processor may execute the program to implement the steps in the method for processing a remote interference measurement signal at the second base station side.

The embodiments of the present disclosure also provide a computer-readable storage medium, having a computer program storing thereon, the computer program being executed by the processor to implement the steps in the method for processing a remote interference measurement signal at the first base station side, or, the computer program being executed by the processor to implement the steps in the method for processing a remote interference measurement signal at the second base station side.

It is to be noted that the above descriptions about the storage medium and device embodiments are similar to descriptions about the method embodiments and beneficial effects similar to those of the method embodiments are achieved. Technical details undisclosed in the storage medium and device embodiments of the present disclosure may be understood with reference to the descriptions about the method embodiments of the present disclosure.

Figure 7:
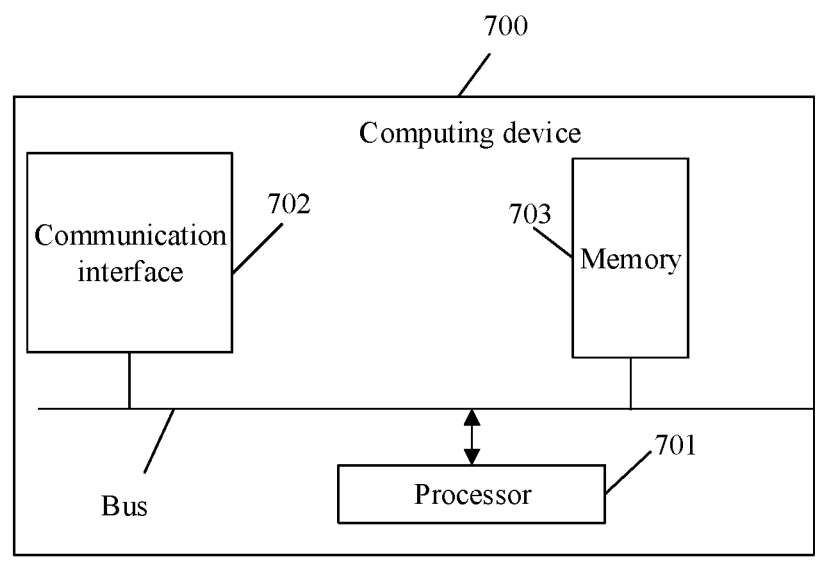
FIG. 7 is a hardware diagram of a computing device in an embodiment of the present disclosure.

It is to be noted that FIG. 7 is a hardware diagram of a computing device (e.g. the base station and the network function entity) according to an embodiment of the present disclosure. As shown in FIG. 7, the hardware entity of the computing device 700 includes a processor 701, a communication interface 702 and a memory 703.

The processor 701 usually controls an overall operation of the computing device 700.

The communication interface 702 may enable the computing device to communicate with other terminals or base stations or network function entities through a network.

The memory 703 is configured to store instructions and applications executable for the processor 701, may also cache data (for example, image data, video data, voice communication data and video communication data) to be processed or having been processed by the processor 701 and each module in the computing device 700 and may be implemented through a flash or a Random Access Memory (RAM).

It is to be understood that "one embodiment" and "an embodiment" mentioned in the whole specification mean that specific features, structures or characteristics related to the embodiment is included in at least one embodiment of the present disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the present disclosure, a magnitude of a sequence number of each process does not mean an execution sequence and the execution sequence of each process should be determined by its function and an internal logic and should not form any limit to an implementation process of the embodiments of the present disclosure. The sequence numbers of the embodiments of the present disclosure are adopted not to represent superiority-inferiority of the embodiments but only for description.

It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

In some embodiments provided by the present disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art should know that all or part of the steps of the method embodiment may be implemented by related hardware instructed through a program, the program may be stored in a computer-readable storage medium, and the program is executed to execute the steps of the method embodiment. The storage medium includes: various media capable of storing program codes such as a mobile storage device, a ROM, a magnetic disk or a compact disc.

Or, when being implemented in form of software function module and sold or used as an independent product, the integrated unit of the present disclosure may also be stored in a computer-readable storage medium. Based on such an understanding, the technical solutions of the embodiments of the present disclosure substantially or parts making contributions to the conventional art may be embodied in form of software product, and the computer software product is stored in a storage medium, including a plurality of instructions configured to enable a computing device (which may be a personal computer, a server, a network device or the like) to execute all or part of the method in each embodiment of the present disclosure. The storage medium includes: various media capable of storing program codes such as a mobile hard disk, a ROM, a magnetic disk or a compact disc.

The above is only the specific implementation modes of the present disclosure and not intended to limit the protection scope of the present disclosure; any change or replacement that those skilled in the art can think of easily in the scope of technologies disclosed by the present disclosure shall fall within the protection scope of the present disclosure. Therefore, the scope of protection of the present disclosure shall be subject to the scope of protection of the claims.

The invention claimed is:

1. A method for processing a remote interference measurement signal, comprising:
   determining, by a first base station, configuration information of an interference measurement signal;
   transmitting, by the first base station, the interference measurement signal according to the configuration information of the interference measurement signal; and
   pre-storing, pre-configuring or randomly selecting, by the first base station, at least one parameter set; or, determining, by the first base station, a parameter set according to configuration of a network function entity,
   wherein the parameter set comprises the following configuration information of the interference measurement signal:
   sequence identification (ID), time domain resource location, and frequency domain location:
   wherein the parameter set further comprises at least one of the following configuration information of the interference measurement signal:
   sequence length, bandwidth, sub-carrier spacing, or transmitting power;
   wherein the time domain resource location is represented by at least one of the following:
   a period and a slot offset in a period;
   a period, a slot offset in a period and the number of repetitions in a period;
   a period, a slot offset in a period, the number of repetitions in a period, a time domain resource granularity, and a symbol location in a time slot;
   a time domain resource granularity and a symbol location in a time slot; or
   a start time of a time domain resource of the interference measurement signal and a duration of the time domain resource of the interference measurement signal;
   wherein the time domain resource location further comprises a location of at least one OFDM symbol in a transmitting time slot; and correspondingly, the method further comprises:
   determining the location of the OFDM symbol according to a symbol offset and/or a number of repetitions in an interference measurement signal slot.

2. The method of claim 1, wherein the interference measurement signal is a signal for measuring a degree of interference between base stations, wherein the degree of interference between base stations comprises at least one of the following:
   a degree of interference of a downlink signal of the first base station to an uplink signal of another base station, or
   a degree of interference of the downlink signal of the first base station to the downlink signal of a terminal served by another base station.

3. The method of claim 1, further comprising:
   reporting, by the first base station, the parameter set to the network function entity.

4. The method of claim 1, further comprising:
   determining, by the first base station, the sequence length according to a system bandwidth of the first base station, a bandwidth of a bandwidth part (BWP) carrying a synchronization signal, a maximum number of sub-carriers, a number of sub-carriers of the BWP carrying the synchronization signal.

5. The method of claim 4, wherein determining, by the first base station, the sequence length according to the maximum number of sub-carriers of the first base station comprises:
   calculating, by the first base station, the sequence length M according to the formula $M=2^{(\text{floor}(\log2(N+1)))}-1$,
   where N is the maximum number of sub-carriers of the base station, or the number of sub-carriers of the BWP carrying the synchronization signal, floor represents rounding down, log2 represents finding a logarithm base 2, and ^ represents a power operation.

6. The method of claim 1, wherein:
   a time domain resource meeting that a remainder obtained by dividing an index of the time domain resource location by the period is equal to a time slot offset in the period is at the time domain resource location; or
   a time domain resource meeting that the remainder obtained by dividing the index of the time domain resource location by the period is equal to a time slot offset in the period, and following Q continuous or discontinuous available time domain resources or Q continuous or discontinuous resource granularities of the available time domain resources, are at the time domain resource location, wherein Q is an integer greater than 0, and the available time domain resources or the resource granularities of the available time domain resources refer to time domain resources or resource granularities of the time domain resources that can be used to transmit the interference measurement signal.

7. A method for processing a remote interference measurement signal, comprising:
   determining, by a second base station, configuration information of at least one interference measurement signal; and
   receiving, by the second base station, the interference measurement signal according to the configuration information of the interference measurement signal; and
   pre-storing, pre-configuring or randomly selecting, by the second base station, at least one group of parameter sets, or determining, by the second base station, a parameter set according to configuration of a network function entity,
   wherein, the parameter set at least comprises the following configuration information of the interference measurement signal: sequence identification (ID), time domain resource location, and frequency domain location;
   wherein the parameter set further comprises at least one of the following configuration information of the interference measurement signal: sequence length, bandwidth, sub-carrier spacing, or transmitting power;

wherein the time domain resource location is represented by at least one of the following:
a period and a slot offset in a period;
a period, a slot offset in a period and the number of repetitions in a period;
a period, a slot offset in a period, the number of repetitions in a period, a time domain resource granularity, and a symbol location in a time slot;
a time domain resource granularity and a symbol location in a time slot; or
a start time of a time domain resource of the interference measurement signal and a duration of the time domain resource of the interference measurement signal;
wherein the time domain resource location further comprises a location of at least one OFDM symbol in a transmitting time slot; and correspondingly, the location of the OFDM symbol is determined according to a symbol offset and/or a number of repetitions in an interference measurement signal slot.

8. The method of claim 7, further comprising:
detecting, by the second base station, the interference measurement signal according to the parameter set, and obtaining measurement results; the measurement results comprise at least one of the following: a parameter identification (ID) of the interference measurement signal, a receiving power of the interference measurement signal and a receiving delay of the interference measurement signal.

9. The method of claim 8, further comprising:
reporting, by the second base station, the measurement results to the network function entity; or,
conducting, by the second base station, interference management according to the measurement results.

10. The method of claim 9, further comprising:
in response to the receiving power of the interference measurement signal exceeding a first threshold, reporting, by the second base station, the measurement results to the network function entity, or conducting interference management, wherein the first threshold is pre-configured, or configured by the network function entity.

11. A base station, comprising a first processor and a first transceiver, wherein:
the first processor is configured to determine configuration information of an interference measurement signal, and
the first processor is further configured to: pre-store, pre-configure or randomly select at least one parameter set; or, determine a parameter set according to configuration of a network function entity, wherein the parameter set comprises the following configuration information of the interference measurement signal: sequence identification (ID), time domain resource location, and frequency domain location: wherein the parameter set further comprises at least one of the following configuration information of the interference measurement signal: sequence length bandwidth, sub-carrier spacing, or transmitting power; and
wherein the time domain resource location is represented by at least one of the following:
a period and a slot offset in a period;
a period, a slot offset in a period and the number of repetitions in a period;
a period, a slot offset in a period, the number of repetitions in a period, a time domain resource granularity, and a symbol location in a time slot;
a time domain resource granularity and a symbol location in a time slot; or
a start time of a time domain resource of the interference measurement signal and a duration of the time domain resource of the interference measurement signal;
wherein the time domain resource location further comprises a location of at least one OFDM symbol in a transmitting time slot; and correspondingly, the first processor is further configured to:
determine the location of the OFDM symbol according to a symbol offset and/or a number of repetitions in an interference measurement signal slot; and
the first transceiver is configured to transmit the interference measurement signal according to the configuration information of the interference measurement signal.

12. A base station, comprising a second processor and a second transceiver, wherein:
the second processor is configured to determine configuration information of at least one interference measurement signal, and
the second processor is further configured to pre-store, pre-configure or randomly select at least one group of parameter sets; or, determine a parameter set according to configuration of a network function entity, wherein, the parameter set at least comprises the following configuration information of the interference measurement signal: sequence identification (ID), time domain resource location, and frequency domain location; wherein the parameter set further comprises at least one of the following configuration information of the interference measurement signal; sequence length, bandwidth, sub-carrier spacing, or transmitting power;
wherein the time domain resource location is represented by at least one of the following:
a period and a slot offset in a period;
a period, a slot offset in a period and the number of repetitions in a period;
a period, a slot offset in a period, the number of repetitions in a period, a time domain resource granularity, and a symbol location in a time slot;
a time domain resource granularity and a symbol location in a time slot; or
a start time of a time domain resource of the interference measurement signal and a duration of the time domain resource of the interference measurement signal;
wherein the time domain resource location further comprises a location of at least one OFDM symbol in a transmitting time slot; and correspondingly, the location of the OFDM symbol is determined according to a symbol offset and/or a number of repetitions in an interference measurement signal slot; and
the second transceiver is configured to receive the interference measurement signal sent by another base station according to the configuration information of the interference measurement signal.

13. The base station of claim 11, wherein the interference measurement signal is a signal for measuring a degree of interference between base stations, wherein the degree of interference between base stations comprises at least one of the following:
a degree of interference of a downlink signal of the base station to an uplink signal of another base station, or
a degree of interference of the downlink signal of the base station to the downlink signal of a terminal served by another base station.

14. The base station of claim 11, wherein the first processor is further configured to:
report the parameter set to the network function entity.

15. The base station of claim 11, wherein the first processor is further configured to:
determine the sequence length according to a system bandwidth of the base station, a bandwidth of a bandwidth part (BWP) carrying a synchronization signal, a maximum number of sub-carriers, a number of sub-carriers of the BWP carrying the synchronization signal.

16. The base station of claim 15, wherein the first processor is further configured to:
calculate the sequence length M according to the formula M=2^(floor(log2(N+1)))−1,
where N is the maximum number of sub-carriers of the base station, or the number of sub-carriers of the BWP carrying the synchronization signal, floor represents rounding down, log2 represents finding a logarithm base 2, and ^ represents a power operation.

17. The base station of claim 11, wherein:
a time domain resource meeting that a remainder obtained by dividing an index of the time domain resource location by the period is equal to a time slot offset in the period is at the time domain resource location; or
a time domain resource meeting that the remainder obtained by dividing the index of the time domain resource location by the period is equal to a time slot offset in the period, and following Q continuous or discontinuous available time domain resources or Q continuous or discontinuous resource granularities of the available time domain resources, are at the time domain resource location, wherein Q is an integer greater than 0, and the available time domain resources or the resource granularities of the available time domain resources refer to time domain resources or resource granularities of the time domain resources that can be used to transmit the interference measurement signal.

18. The base station of claim 12, wherein the second processor is further configured to:
detect the interference measurement signal according to the parameter set, and obtain measurement results; the measurement results comprise at least one of the following: a parameter Identification (ID) of the interference measurement signal, a receiving power of the interference measurement signal and a receiving delay of the interference measurement signal.

19. The base station of claim 18, wherein the second processor is further configured to:
report the measurement results to the network function entity; or,
conduct interference management according to the measurement results.

20. The base station of claim 19, wherein the second processor is further configured to:
in response to the receiving power of the interference measurement signal exceeding a first threshold, report the measurement results to the network function entity, or conduct interference management, wherein the first threshold is pre-configured, or configured by the network function entity.

* * * * *